(12) United States Patent
Karol et al.

(10) Patent No.: US 6,806,241 B2
(45) Date of Patent: Oct. 19, 2004

(54) ANTIOXIDANT ADDITIVE COMPOSITIONS AND LUBRICATING COMPOSITIONS CONTAINING THE SAME

(75) Inventors: Thomas J. Karol, Holualoa-Kona, HI (US); Steven G. Donnelly, Bethel, CT (US); Ronald J. Hiza, Monroe, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 0 days.

(21) Appl. No.: 10/247,012

(22) Filed: Sep. 19, 2002

(65) Prior Publication Data

US 2003/0158051 A1 Aug. 21, 2003

Related U.S. Application Data

(60) Provisional application No. 60/335,877, filed on Nov. 15, 2001, and provisional application No. 60/324,158, filed on Sep. 21, 2001.

(51) Int. Cl.⁷ .................................... C10M 141/12
(52) U.S. Cl. .................. 508/273; 508/274; 508/363; 508/367; 508/444; 508/563
(58) Field of Search ........................ 508/273

(56) References Cited

U.S. PATENT DOCUMENTS

| | | | |
|---|---|---|---|
| 2,492,314 A | 12/1949 | Olin et al. | 260/429 |
| 3,356,702 A | 12/1967 | Farmer et al. | 260/429 |
| 3,567,638 A | 3/1971 | Braid | 252/46.7 |
| 4,098,705 A | 7/1978 | Sakurai et al. | 252/33.6 |
| 4,215,067 A | 7/1980 | Brannen et al. | 260/429.9 |
| 4,648,985 A | 3/1987 | Thorsell et al. | 252/32.5 |
| 4,761,482 A | 8/1988 | Karol | 548/142 |
| 4,880,437 A | 11/1989 | Karol | 44/57 |
| 4,889,647 A | 12/1989 | Rowan et al. | 252/42.7 |
| 5,137,647 A | 8/1992 | Karol | 252/33.6 |
| 5,364,545 A | 11/1994 | Arai et al. | 252/32.7 |
| 5,627,146 A | 5/1997 | Tanaka et al. | 508/363 |
| 5,840,672 A | 11/1998 | Gatto | 508/334 |
| 6,017,858 A | 1/2000 | Karol et al. | 508/303 |
| 6,207,623 B1 | 3/2001 | Butler et al. | 508/273 |
| 6,369,005 B1 | 4/2002 | Karol et al. | 508/364 |
| 6,509,303 B1 | 1/2003 | Gatto | 508/362 |

*Primary Examiner*—Ellen M. McAvoy
(74) *Attorney, Agent, or Firm*—Norris McLaughlin & Marcus P.A.

(57) ABSTRACT

Disclosed are antioxidant compositions comprising of:
(1) an organomolybdenum compound;
(2) an alkylated diphenylamine; and
(3) a sulfur compound selected from the group consisting of:
 (a) thiadiazole;
 (b) dithiocarbamate; and
 (c) mixtures of (a) and (b).

11 Claims, No Drawings

ANTIOXIDANT ADDITIVE COMPOSITIONS AND LUBRICATING COMPOSITIONS CONTAINING THE SAME

This application claims benefit of provisional application No. 60/335,877, filed Nov. 15, 2001, and claims benefit of appl. Ser. No. 60/324,158, filed Sep. 21, 2001.

BACKGROUND OF THE INVENTION

The invention concerns additive compositions and lubricating compositions containing the described additive compositions which have improved antioxidant effects. These antioxidant additive compositions, when added to a base oil to form a lubricating composition, result in low levels of deposits and display improved copper corrosion inhibition and friction properties It is known from the prior art that certain organomolybdenum complexes possess desirable lubricating characteristics including antiwear or antioxidant properties.

U.S. Pat. No. 5,364,545, assigned to Tonen Corporation, which is hereby incorporated by reference, describes a lubricating oil composition having a low coefficient of friction and reduced copper corrosion as a 3 component system comprising: (a) a lubricating oil basestock, (b) from 0.01 to 10% by weight, based on the oil composition, of at least one organomolybdenum compound selected from the group consisting of oxymolybdenum monoglyceride and oxymolybdenum diethanolamide; and (c) from 0.5 to 7% by weight, based on the oil composition, of at least one organozinc compound selected from the group consisting of zinc dithiophosphate (ZnDTP) and zinc dithiocarbamate.

The invention of Tonen Corp. is directed toward compositions which include a ZnDTP as can be seen from their described examples. Components such as ZnDTP act as antiwear, metal passivator and antioxidant agents in lubrication formulations. However, use of these metal phosphate compounds often result in poisoning of the catalytic converter and as such the need remains for an additive composition which does not require a metal phosphate compound.

U.S. Pat. No. 5,840,672, assigned to Ethyl Corporation, which is hereby incorporated by reference describes an antioxidant system for lubrication base oils as a 3 component system comprising MOLYVAN® 855 (organomolybdenum complex of organic amide)/ADPA (alkylated diphenylamine)/sulfurized isobutylene and/or sulfurized phenol. This invention relates to antioxidant compositions comprising (A) at least one secondary diarylamine, (B) at least one sulfurized olefin and/or sulfurized hindered phenol, and (C) at least one oil soluble molybdenum compound.

However, it is well known in the art that while it is possible to have a good antioxidant system in the additive composition, the resulting lubricating composition after the additive composition has been added can result in unacceptable levels of deposits or sludge when exposed to high temperatures such as those temperatures observed during operation of an engine.

U.S. Pat. Nos. 6,017,858 and 6,369,005, both assigned to R. T. Vanderbilt Company, Inc., which are hereby incorporated by reference, describes synergistic organomolybdenum compositions and lubricating compositions based on 2 component synergistic system: (1) MOLYVAN® 855 lubricant additive and (2) 1,3,4-thiadiazole compounds or DTC (dithiocarbamates) or DTP (phosphorodithioate) compounds. This invention relates to synergistic antiwear compositions comprising an organomolybdenum complex and an organic sulfur compound selected from 2,5-dimercapto-1,3,4-thiadiazole derivatives, bisdithiocarbamate esters, metal dithiocarbamates, metal phosphorodithioates and phosphorodithioate esters. The organomolybdenum complex is a reaction product prepared by reacting 1 mole fatty oil, 1.0 to 2.5 moles diethanolamine and a molybdenum source.

Surprisingly, it has been discovered that an additive compositions which comprises (1) an organomolybdenum compound; (2) an alkylated diphenylamine; and (3) a sulfur containing compound selected from the group consisting of: (a) thiadiazole; (b) dithiocarbamate; and (c) mixtures of (a) and (b) unexpectedly possess antioxidant properties. In addition, the additive compositions of the invention also result in low levels of deposits and possess improved copper corrosion inhibition and friction properties when added to a base oil to form a lubricating composition.

SUMMARY OF THE INVENTION

According to the invention, there are provided improved antioxidant additive compositions comprising:
(1) an organomolybdenum compound;
(2) an alkylated diphenylamine; and
(3) a sulfur containing compound selected from the group consisting of:
   (a) thiadiazole;
   (b) dithiocarbamate; and
   (c) mixtures of (a) and (b)

Also provided are lubricating compositions which contain the improved antioxidant additive compositions described above.

The antioxidant additive compositions of the invention, when added to a base oil to form a lubricating composition, result in low levels of deposits and display improved copper corrosion inhibition and friction properties.

DETAILED DESCRIPTION OF THE INVENTION (1) Organomolybdenum Compound

An organomolybdenum complex is prepared by reacting about 1 mole of fatty oil, about 1.0 to 2.5 moles of diethanolamine and a molybdenum source sufficient to yield about 0.1 to 12.0 percent of molybdenum based on the weight of the complex at elevated temnperatures (i.e. greater than room temperature). A temperature range of about 70° to 160° C. is considered to be an example of an embodiment of the invention. The organomolybdenum component of the invention is prepared by sequentially reacting fatty oil, diethanolamine and a molybdenum source by the condensation method described in U.S. Pat No. 4,889,647, incorporated herein by reference, and is commercially available from R. T. Vanderbilt Company, Inc. of Norwalk. Conn. as Molyvan® 855 lubricant additive. The reaction yields a reaction product mixture. The major components are believed to have the structural formulae:

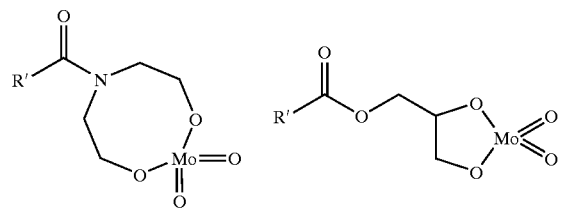

wherein R' represents a fatty oil residue. An embodiment for the present invention are fatty oils which are glyceryl esters of higher fatty acids containing at least 12 carbon atoms and may contain 22 carbon atoms and higher. Such esters are commonly known as vegetable and animal oils. Examples of useful vegetable oils are oils derived from coconut, corn, cottonseed, linseed, peanut, soybean and sunflower seed. Similarly, animal fatty oils such as tallow may be used. The source of molybdenum may be an oxygen-containing molybdenum compound capable of reacting with the intermediate reaction product of fatty oil and diethanolamine to form an ester-type molybdenum complex. The source of molybdenum includes, among others, ammonium molybdates, molybdenum oxides and mixtures thereof.

(2) Alkylated Diphenyl Amines (ADPA)

Alkylated diphenyl amines are widely available antioxidants for lubricants. One possible embodiment of an alkylated diphenyl amine for the invention are secondary alkylated diphenylamines such as those described in U.S. Pat. No. 5,840,672, which is hereby incorporated by reference. These secondary alkylated diphenylamines are described by the formula X—NH—Y, wherein X and Y each independently represent a substituted or unsubstituted phenyl group having wherein the substituents for the phenyl group include alkyl groups having 1 to 20 carbon atoms, alkylaryl groups, hydroxyl, carboxy and nitro groups and wherein at least one of the phenyl groups is substituted with an alkyl group of 1 to 20 carbon atoms. Another possible ADPA for use in the invention is a reaction product of N-phenyl-benzenamine and 2,4,4-trimethylpentene. It is also possible to use commercially available ADPAs including VANLUBE®SL, DND, NA, 81 end 961 alkylated diphenylamines manufactured by R. T. Vanderbilt Company, Inc., Naugalube® 640,680 and 438L alkylated diphenylamines manufactured by Uniroyal Chemical and Irganox®L-57 and L-67 diphenylamines manufactured by Ciba-Geigy and Lubrizol 5150A & C diphenylamines manufactured by Lubrizol.

(3) Sulfur-Containing Compound (a) Thiadiazole

The 1,3,4-thiadiazoles of formula I may be prepared by the method disclosed in U.S. Pat. Nos. 4,761,482 and 4,880,437, incorporated herein by reference:

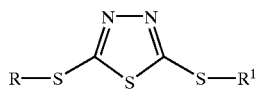

(I)

wherein R and $R^1$ are independently selected from the group consisting of hydrogen, alkyl, hydroxyalkyl, alkylthio, phenylalkyl, alkylated phenylalkyl, terpene residue and maleic acid residue of the formula

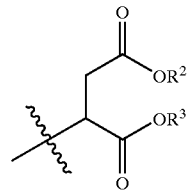

wherein $R^2$ and $R^3$ are independently selected from the group consisting
of hydrogen, branched or straight chain alkyl groups and cyclic aliphatic groups,
wherein at least one of R and $R^1$ is not hydrogen.

An embodiment for the present invention includes alkyls which have from 1 to 50 carbon atoms which may be branched or straight chain and may be substituted with a hydroxyl group and an aryl group. Another embodiment for the present invention are R and $R^1$ which are alkyl and alkylthio groups which contain 1 to 22 carbon atoms and may be branched or straight chain. Additional embodiments for the present invention include compounds wherein R and $R^1$ together contain a total of at least 22 carbon atoms in their alkyl and/or alkylthio groups.

Embodiments of terpene residues for the present invention include terpenes which are derived from pinene and limonene.

An embodiment of maleic acid residues for the present invention include maleic acid residues where $R^2$ and $R^3$ independently represents an alkyl group with 1 to 22 carbon atoms or $C_5$–$C_7$-cycloalkyl group. A further embodiment includes the total number of carbon atoms for $R^2$ and $R^3$ combined being from 8 to 44 carbon atoms.

Commercially available thiadiazoles derivatives are VANLUBE® 871 (butanedioic acid ((4,5-dihydro-5-thioxo-1,3,4-thiadiazol-2-yl) thio-bis (2-ethylhexyl) ester) CUVAN®826 (2,5-dimercapto-1,3,4-thiasiazole) and CUVAN® 484 (alkylthiadiazole) manufactured by R. T. Vanderbilt Company.

(b) Dithiocarbamate (i) Bisdithiocarbamate

The bisdithiocarbamates of formula II are known compounds described in U.S. Pat. No. 4,648,985, incorporated herein by reference:

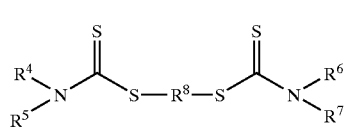

(II)

The compounds are characterized by $R^4$, $R^5$, $R^6$ and $R^7$ which are the same or different and are hydrocarbyl groups having 1 to 13 carbon atoms.

Embodiments for the present invention include bisdithiocarbamates wherein $R^4$, $R^5$, $R^6$ and $R^7$ are the same or different and are branched or straight chain alkyl groups having 1 to 8 carbon atoms.

$R^8$ is an aliphalic group such as straight and branched alkylene groups containing 1 to 8 carbons. An embodiment for $R^8$ is methylenebis (dibutyldithiocarbamate) available commercially under the tradename VANLUBE® 7723 additive from R. T. Vanderbilt Company, Inc.

(ii) Ashless Dithiocarbamate Ester.

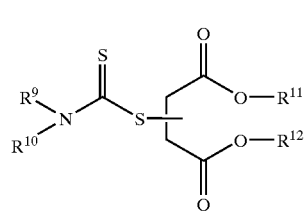

(III)

The compounds of formula III are characterized by groups $R^9$, $R^{10}$, $R^{11}$ and $R^{12}$ which are the same or different and are hydrocarbyl groups having 1 to 13 carbon atoms. VANLUBE® 732 (dithiocarbamate derivative) and VANLUBE® 981 (dithiocarbamate derivative) are commercially available from R. T. Vanderbilt Company, Inc.

(iii) Metal Dithiocarbamates.

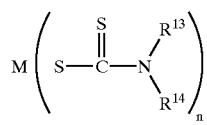
(IV)

The dithiocarbamates of the formula IV are known compounds. One of the processes of preparation is disclosed in U.S. Pat. No. 2,492,314, which is hereby incorporated by reference. $R^{13}$ and $R^{14}$ in the formula IV represent branched and straight chain alkyl groups having 1 to 8 carbon atoms, M is a metal cation and n is an integer based upon the valency of the metal cation (e.g. n=1 for sodium ($Na^+$); n=2 for zinc ($Zn^{2+}$); etc.). Molybdenum dithiocarbamate processes are described in U.S. Pat. Nos. 3,356,702; 4,098,705; and 5,627,146, each of which is hereby incorporated by reference. Substitution is described as branched or straight chain ranging from 8 to 13 carbon atoms in each alkyl group.

Embodiments for the present invention include metal dithiocarbamates which are antimony, zinc and molybdenum dithiocarbamates.

Described below are various embodiments of ranges of content of the above components, given in weight percent of the total lubricant composition, for the compositions of the invention:

| Components | Embodiment 1 (%) | Embodiment 2 (%) | Embodiment 3 (%) |
|---|---|---|---|
| Total of composition (1) + (2) + (3) | 0.15–12.0 | 0.40–8.5 | 0.75–3.5 |
| (1) Organomolybdenum compound | 0.05–3.0 | 0.10–2.0 | 0.15–1.0 |
| (2) ADPA | 0.05–5.0 | 0.1–2.0 | 0.20–1.5 |
| (3) Sulfur-containing compound* | 0.05–4.0 | 0.20–2.5 | 0.40–1.0 |
| (a) Thiadiazole | 0–4.0 | 0–2.5 | 0–1.0 |
| (b) Dithiocarbamate | 0–4.0 | 0–2.5 | 0–1.0 |

*thiadiazole dithiocarbamate, or mixtures thereof

This invention is useful with phosphorous dithiophosphate compounds. Embodiments of dithiophosphates for the present invention include:

(1) Metal Phosphorodithioates

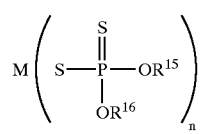
(V)

The metal phosphorodithioates of the formula V are known, commercially available materials. One of the processes of preparation is taught by U.S. Pat. No. 4,215,067, which is hereby incorporated by reference. (M and n are as defined above for the metal dithiocarbamates) $R^{15}$ and $R^{16}$ represent branched and straight chain alkyl groups having 1–22 groups and may be derived from fatty acids and embodiment of which are the zinc phosphorodithioates. The metal ion in formula V may be selected from the following groups of the Periodic Table: IIA, IIIA, VA, VIA, IB, IIB, VIB and VIII. Amine salts of the compounds are also useful synergists of the invention. Embodiments of such amine salts include those prepared from alkyl amines and mixed alkyl amines. An additional embodiment includes amine salts based on fatty acid amines.

(2) Phosphorodithioate esters

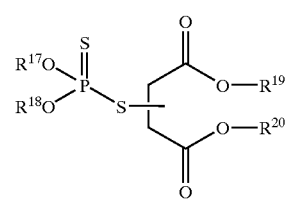
(VI)

The phosphorodithioate esters of the formula VI are known compounds. One of the processes of manufacture is disclosed in U.S. Pat. No. 3,567,638, which is hereby incorporated by reference. $R^{17}$, $R^{18}$, $R^{19}$ and $R^{20}$ may be the same or different and may be branched and straight chain alkyl groups. Embodiments for the present invention include branched or straight chain alkyl groups containing 1 to 8 carbon atoms.

Embodiments for the ranges of phosphorodithioate (also known as dithiophosphate) compound, or mixture of dithiophosphate compounds, are 0.05–2.00%; 0.5–1.50%; and 0.5–0.8% (each percentage being percent by weight based upon the total weight of the composition).

The antioxidant lubrication compositions of the present invention may optionally contain additional friction modifiers, antioxidants and/or copper corrosion inhibitors.

Embodiments of friction modifiers which may optionally be added can be found for example in U.S. Pat. Nos. 4,792,410 and 5,110,488, which are incorporated herein by reference and include fatty phosphites, fatty acid amides, fatty epoxides, borated fatty epoxides, fatty amines, glycerol esters, borated glycerol esters alkoxylated fatty amines, borated alkoxylated fatty amines, metal salts of fatty acids, sulfurized olefins, fatty imidazolines and mixtures thereof.

Embodiments of antioxidants which may optionally be added include hindered phenolic antioxidants, secondary aromatic amine antioxidants, sulfurized phenolic antioxidants, oil-soluble copper compounds, phosphorus-containing antioxidants, organic sulfides, disulfides and polysulfides.

Embodiments of copper corrosion inhibitors which may optionally be added include include thiazoles, triazoles and thiadiazoles. Example embodiments of such compounds include benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis (hydrocarbylthio)-1,3,4-thiadiazoles, and 2,5-bis (hydrocarbyldithio)-1,3,4-thiadiazoles.

The organomolybdenum compound, alkylated diphenylamine and sulfur containing compound can either be added individually to a base oil to form the lubricating composition of the invention or they can be premixed to form a composition which can then be added to the base oil. The resulting lubricating composition should comprise a major amount (i.e. at least 90% by weight) of base oil and a minor amount (i.e. less than 10% by weight) of the additive composition.

EXAMPLES

In Tables 1 and 2, the present invention is compared with a composition taught by U.S. Pat. No. 5,840,672 (Comparative Examples 1 and 4). Tables 1 and 2 each compare an inventive composition with a different sulfur compound to the prior art compounds. Examples 2 and 5 are inventive compositions in which the equivalent weight percent of the corresponding three components of comparative examples 1 and 4, are maintained. That is, the compositions (comparing Example 2 to 1; and Example 5 to 4) are identical except for the sulfur component, either sulfurized isobutylene or thiadiazole. Examples 3 and 6 are identical to comparative examples 1 and 4, respectively, except that the sulfur compounds differ as shown. However, in these cases, while the sulfur compounds and the amounts of the compounds in each composition differ, the amount of sulfur in each example is the same. Thus, this second group illustrates the effect of the difference in sulfur compound used, independent of the amount of sulfur present.

Table 1—Test of Additive Composition in Lubricating Composition
(Organomolybdenum Compound, Alkylated Diphenylamine and Thiadiazone)

The table below compares examples of the additive compositions of the invention (examples 2, 3, 5 and 6) with examples from U.S. Pat. No. 5,840,672 (comparative examples 1 and 4) which utilizes a sulfurized isobutylene in lieu of a sulfur compound.

All tests were generally conducted in accordance with the ASTM test methods designated in parenthesis below.

|  | 1 | 2 | 3 | 4 | 5 | 6 |
|---|---|---|---|---|---|---|
| Organomolybdenum (Molyvan ® 855) | 0.16 | 0.16 | 0.16 | 0.40 | 0.40 | 0.40 |
| Alkylated diphenylamine (Vanlube ® 81) | 0.20 | 0.20 | 0.20 | 0.20 | 0.20 | 0.20 |
| Sulfurized Isobutylene (Vanlube ® SB) | 0.40 | — | — | 0.40 | — | — |
| Thiadiazole (Vanlube ® 871) | — | 0.40 | 0.93 | — | 0.40 | 0.93 |
| Dispersant TC 9596A 91-4284 | 5.00 | 5.00 | 5.00 | 5.00 | 5.00 | 5.00 |
| Base oil (Group II Base Blend) | 94.24 | 94.24 | 93.71 | 94.00 | 94.00 | 93.47 |
| TEOST deposits test | 74.4 | 61.5 |  |  |  |  |
| Copper Corrosion, 24 h @ 121° C.-(ASTM D-130) | 4a | 3b |  |  |  |  |
| Oxidation Induction Time (in minutes) of Lubricating Oils by Pressure Differential Scanning Calorimetry (PDSC), 500 psi @ 210° C.-(ASTM D6186) |  |  |  |  |  |  |
| Run 1 | 11.6 | 15.9 | 13.9 |  |  |  |
| Run 2 | 14.3 | 12.5 | 12.4 |  |  |  |
| Run 3 | 17.1 | 13.9 | 9.8 |  |  |  |
| Run 4 | 14.8 | 12.8 | 13.8 |  |  |  |
| Run 5 | 15.6 | — | — |  |  |  |
| Run 6 | 12.2 | — | — |  |  |  |
| Average (min.) | 14.3 | 13.8 | 12.5 |  |  |  |
| T-1000 Thin-Film Oxygen Uptake-TFOUT in minutes-(ASTM D4742) |  |  |  |  |  |  |
|  | 160 | 117 | 470 |  |  |  |
|  | 172 | 230 | 530 |  |  |  |
|  | — | 185 | — |  |  |  |
| Average, Minutes | 166 | 177 | 500 |  |  |  |
| T-999 Falex No. 1 Low Pressure @ 20 lb, 90 minutes |  |  |  |  |  |  |
| Friction Coefficient: @ 90 minutes |  |  |  | 0.0220 | 0.0150 | 0.0075 |
|  |  |  |  | 0.0160 |  |  |

Examples 2 and 3 show a reduction in deposits and improved anti-oxidative properties relative to comparative example 1. Examples 5 and 6 show a reduction friction coefficient relative to comparative example 4.

Table 2—Test of Additive Composition in Lubricating Composition
(Organomolybdenum Compound, Alkylated Diphenylamine and Dithiocarbamate)

The table below compares examples of the additive compositions of the invention (examples 8, 10 and 11) with examples from U.S. Pat. No. 5,840,672 (comparative examples 7 and 9) which utilizes a sulfurized isobutylene in lieu of a sulfur compound.

All tests were generally conducted in accordance with the ASTM test methods designated in parenthesis below.

Example 8 shows improved copper corrosion properties relative to comparative example 7. Examples 10 and 11 show improved friction properties relative to comparative example 9.

Table 3—Test of Additive Composition in Lubricating Composition
(Organomolybdenum Compound, Alkylated Diphenylamine and Dithiocarbamate)

The additive compositions of the invention were added to a standard base oil (5W-20) to form examples of the lubricating composition of the invention (examples 20–23) and compared with lubricating compositions which do not contain the three components of the additive compositions of the invention. (Figure below are in % by weight except where otherwise indicated)

|  | 7 | 8 | 9 | 10 | 11 |
|---|---|---|---|---|---|
| Organomolybdenum (Molyvan ® 855) | 0.16 | 0.16 | 0.40 | 0.40 | 0.40 |
| Alkylated diphenylamine (Vanlube ® 81) | 0.20 | 0.20 | 0.20 | 0.20 | 0.20 |
| Sulfurized Isobutylene (Vanlube ® SB) | 0.40 | — | 0.40 | — | — |
| Methylene bis(dibutyl) dithiocarbamate (Vanlube ® 7723) | — | 0.40 | — | 0.40 | 0.93 |
| Dispersant TC 9596A 91-4284 | 5.00 | 5.00 | 5.00 | 5.00 | 5.00 |
| Base oil (Group II Base blend) | 94.24 | 94.24 | 94.00 | 94.00 | 93.47 |
| Copper Corrosion, 24 h @ 121° C.-(ASTM D-130) | 4a | 3b | | | |
| T-1000 Thin-Film Oxygen Uptake-TFOUT in minutes-(ASTM D4742) |  |  |  |  |  |
|  | 160 | 190 |  |  |  |
|  | 172 | 186 |  |  |  |
| Average, Minutes | 166 | 188 |  |  |  |
| T-999 Falex No. 1 Low Pressure @ 20 lb, 90 minutes- |  |  |  |  |  |
| Friction Coefficient: @ 90 minutes |  |  | 0.0220/ 0.0160 | 0.0065 | 0.0006 |

| Compound | 13 | 14 | 15 | 16 | 17 | 18 | 19 | 20 | 21 | 22 | 23 |
|---|---|---|---|---|---|---|---|---|---|---|---|
| Base oil (GF-4 5W-20) | 100 | 99.10 | 99.0 | 98.5 | 97.61 | 98.11 | 97.5 | 97.34 | 97.05 | 96.61 | 96.61 |
| Molyvan ® 855 |  | 0.90 |  |  | 0.89 | 0.89 |  | 0.16 | 0.45 | 0.89 |  |
| Vanlube ® AZ (50% active) |  |  | 1.0 |  |  | 1.0 | 1.0 | 1.0 | 1.0 | 1.0 |  |
| Vanlube SL |  |  |  | 1.5 | 1.5 |  | 1.5 | 1.5 | 1.5 | 1.5 |  |
| Pre-mixture of Molyvan ® 855 (26.3 mol. %) Vanlube ® AZ (29.5 mol. %) Vanlube ® SL (44.2 mol. %) |  |  |  |  |  |  |  |  |  |  | 3.39 |
| ppm Mo | 0 | 702 | 0 | 0 | 703 | 703 | 0 | 126 | 355 | 703 | 703 |
| TEOST MHT-4 |  |  |  |  |  |  |  |  |  |  |  |
| Deposit on rod, mg |  |  |  | 66.9 | 58.2 | 94.0 |  |  |  |  |  |
| Total deposits, mg | 105.5 | 99.7 | 81.3 |  |  |  | 37.4 | 31.6 | 29.5 | 25.1 | 28.8 |

Molyvan ® 855 (organomolybdenum complex of organic amide)
Vanlube ® AZ (zinc diamyl dithiocarbamate)
Vanlube ® SL (alkylated diphenylamine)
TEOST MHT-4—Thermo-oxidation engine oil simulation-moderately high temperature (an ASTM approved procedure)

Example 23 is similar to example 22 but each of the components were pre-mixed together prior to their addition to the base oil.

Each of the above lubricating compositions were subjected to TEOST MHT-4 conditions, i.e. exposure for 24 hours at 285° C. As can be seen from the data above, the 3-component combination of an organomolybdenum compound; an alkylated diphenylamine and sulfur compound gave an unexpected decrease in total deposits based upon the components alone or in 2-component compositions.

What is claimed is:

1. A lubricating composition comprising a major amount of base oil and a minor amount of an antioxidant composition comprising:

(1) an organomolybdenum compound prepared by reacting:
      (a) about 1.0 mole of fatty oil having 12 or more carbon atoms;
      (b) about 1.0 to 2.5 moles diethanolamine; and
      (c) a molybdenum source sufficient to yield about 0.1 to 12.0 percent of molybdenum based on the weight of the complex, the reaction being carried out at about 70° to 160° C.;
   (2) an alkylated diphenylamine being
      (a) a secondary alkylated diphenylamine of the formula X—NH—Y, wherein X and Y each independently represent a substituted or unsubstituted phenyl group wherein the substituents for the phenyl group are selected form the group consisting of alkyl groups having 1 to 20 carbon atoms, alkylaryl groups, hydroxyl, carboxy and nitro groups and at least one of the phenyl groups is substituted with an alkyl group having 1 to 20 carbon atoms; or
      (b) the reaction reaction product of N-phenyl-benzenamine and 2,4,4-trimethylpentene; and
   (3) a sulfur compound selected as one or more of the group consisting of:
      (a) thiadiazole of formula (I):

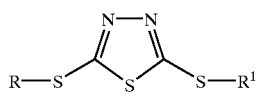

(I)

wherein R and $R^1$ are independently selected from the group consisting of hydrogen, alkyl, hydroxyalkyl, alkylthio, phenylalkyl, alkylated phenyalkyl, terpene residue and maleic acid residue of the formula

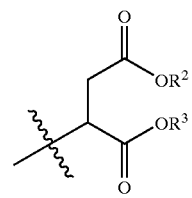

wherein $R^2$ and $R^3$ are independently selected from the group consisting of hydrogen, branched or straight chain alkyl groups and cyclic aliphatic groups, wherein at least one of R and $R^1$ is not hydrogen;

(b) a dithiocarbamate of formula (II),

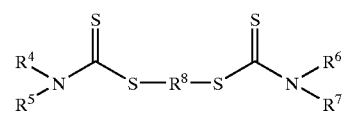

(II)

wherein, $R^4$, $R^5$, $R^6$ and $R^7$ which are the same of different and are hydrocarbyl groups having 1 to 13 carbon atoms; and $R^6$ is an aliphatic group such as straight and branched alkylene groups containing 1 to 8 carbons; and (c) a metal dithiocarbamate formula (IV)

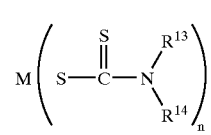

(IV)

wherein $R^{13}$ and $R^{14}$ represent branched and straight chain alkyl groups having 1 to 8 carbon atoms, M is a metal cation and n is an Integer based upon the valency of the metal cation wherein the amount of (1) is form about 0.1–1.0% by weight, the amount of (2) is from about 0.1–5.0% by weight and the amount of (3) is from 0.05–2.5% by weight, based on the total weight of the composition.

2. The antioxidant composition of claim 1, wherein R and $R^1$ are independently selected from the group consisting of hydrogen, alkyl, terpene residue and maleic acid residue.

3. The antioxidant composition of claim 1, wherein:
   the alkylated diphenylamine comprises a reaction product of N-phenyl-benzenamine and 2,4,4-trimethylpentene; and
   the sulfur compound comprises one or more of the group consisting of butanedioic acid ((4,5-dihydro-5-thioxo-1,3,4-thiadiazol-2-yl) thio-bis (2-ethylhexyl) ester, methylene bis-dibutyl dithiocarbamate and zinc dithiocarbamate.

4. The lubricating composition of claim 1 which further comprises additional friction modifiers, antioxidants and/or copper corrosion inhibitors.

5. The lubricating composition of claim 1, wherein the sulfur compound comprises the thiadiazole of formula (I) present at about 0.05–1.0 weight %.

6. The lubricating composition of claim 5, wherein the thiadiazole comprises butanedioic acid ((4,5-dihydro-5-thioxo-1,3,4-thiadiazol-2-yl) thio-bis (2-ethylhexyl)ester.

7. The lubricating composition of claim 1, wherein the sulfur compound comprises the dithiocarbamate of formula (II) present at about 0.2–1.0%.

8. The lubricating composition of claim 7, wherein the dithiocarbamate comprises methylene bis-dibutyl dithiocarbamate.

9. The lubricating composition of claim 1, wherein the sulfur compound comprises the metal dithiocarbamate of formula (IV) present at about 0.2–2.5%.

10. The lubricating composition of claim 9, wherein the metal dithiocarbamate comprises zinc dithiocarbamate.

11. The lubricating composition of claim 1, wherein the alkylated diphenylamine comprises the reaction product of N-phenyl-benzenamine and 2,4,4-trimethylpentene.

* * * * *